(12) United States Patent
Benedetti

(10) Patent No.: US 7,278,814 B2
(45) Date of Patent: Oct. 9, 2007

(54) APPARATUS FOR EMPTYING CONTAINERS OF FRUIT AND VEGETABLE PRODUCE

(75) Inventor: Angelo Benedetti, Savarna (IT)

(73) Assignee: UNITEC S.r.L., Lugo (IT)

( * ) Notice: Subject to any disclaimer, the term of this patent is extended or adjusted under 35 U.S.C. 154(b) by 339 days.

(21) Appl. No.: 10/743,525

(22) Filed: Dec. 22, 2003

(65) Prior Publication Data
US 2004/0191035 A1    Sep. 30, 2004

(30) Foreign Application Priority Data
Dec. 23, 2002   (EP)   .................................. 02425794

(51) Int. Cl.
*B65G 65/23* (2006.01)
(52) U.S. Cl. ...................................... 414/420; 414/416
(58) Field of Classification Search ................ 414/419, 414/420, 421, 416, 425, 788.7
See application file for complete search history.

(56) References Cited
U.S. PATENT DOCUMENTS

| 2,498,740 A | * | 2/1950 | Miller | ...................... 414/795.4 |
| 2,540,766 A | * | 2/1951 | Stilwell et al. | ............. 414/414 |
| 2,716,500 A | * | 8/1955 | Criger | ......................... 414/413 |
| 2,804,982 A | * | 9/1957 | Verrinder | ..................... 414/413 |
| 3,767,073 A | | 10/1973 | DeGreef | |
| 4,234,279 A | | 11/1980 | Lotti | |
| 5,797,716 A | * | 8/1998 | Herrin | ........................ 414/420 |

FOREIGN PATENT DOCUMENTS

EP           0 968 942         6/1999

* cited by examiner

*Primary Examiner*—Charles A Fox
(74) *Attorney, Agent, or Firm*—Collard & Roe, P.C.

(57) ABSTRACT

An apparatus for emptying containers of fruit and vegetable produce, wherein a tipping device receives a container, tips the container, and unloads the container onto a conveying device for feeding the container in a given traveling direction and along a path extending between an input station connecting with the tipping device, and an emptying station for emptying the container; the path being of a length, measured parallel to the traveling direction, at least equal to the length of the container, also measured parallel to the traveling direction.

4 Claims, 8 Drawing Sheets

APPARATUS FOR EMPTYING CONTAINERS OF FRUIT AND VEGETABLE PRODUCE

The present invention relates to an apparatus for emptying containers of fruit and vegetable produce.

BACKGROUND OF THE INVENTION

More specifically, the present invention relates to an apparatus of the type described, for example, in U.S. Pat. No. 4,234,279, and comprising a tipping device for tipping at least one container and movable between a first operating position to load the container, and a second operating position to unload the container; and a conveying device, which has an input station for receiving the container from the tipping device, and an emptying station for emptying the container, and feeds the container along a path extending between said input and emptying stations and in a traveling direction sloping normally by an angle of other than 90° with respect to an insertion direction in which the container is inserted into the tipping device.

The apparatus also comprises an ejecting device for transferring the container from the tipping device to the conveying device at a given traveling speed when the tipping device is in the second operating position.

Since the distance, measured parallel to said traveling direction, between the input and emptying stations is less than the length of each container, also measured parallel to the traveling direction, emptying of the container commences when part of the container is still inside the tipping device.

Consequently, between commencing to empty the container and completing transfer of the container from the tipping device to the conveying device, said traveling speed must be relatively slow and at most such as to enable the container to be emptied properly.

Since the tipping device therefore remains in the second operating position for a fairly long time, known apparatuses of the above type, though widely used, have a fairly low output rate.

SUMMARY OF THE INVENTION

It is an object of the present invention to provide an apparatus for emptying containers of fruit and vegetable produce, designed to eliminate the aforementioned drawbacks, and which is also cheap and easy to produce.

According to the present invention, there is provided an apparatus for emptying containers of fruit and vegetable produce, the apparatus comprising a tipping device for tipping at least one container and movable between a first operating position to load said container, and a second operating position to unload the container; and a conveying device having an input station for receiving the container from the tipping device, and an emptying station for emptying the container, the conveying device feeding the container in a given first direction and along a path extending between said input and emptying stations; and being characterized in that said path is of a length, measured parallel to said first direction, at least equal to a length of said container, also measured parallel to said first direction.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
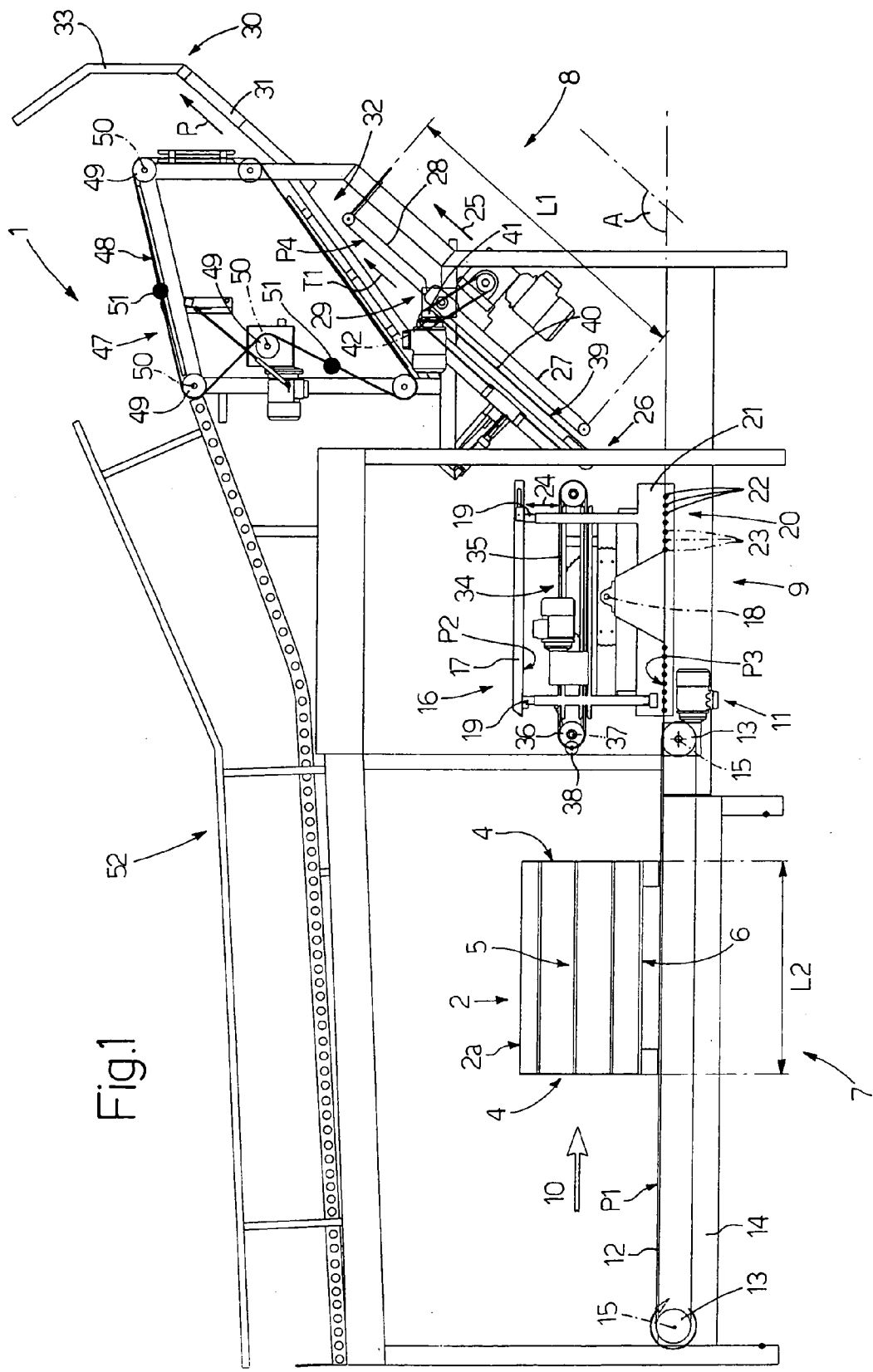
FIGS. 1 to 7 show schematic side views, with parts removed for clarity, of a preferred embodiment of the apparatus according to the present invention in successive operating positions.
Figure 5:
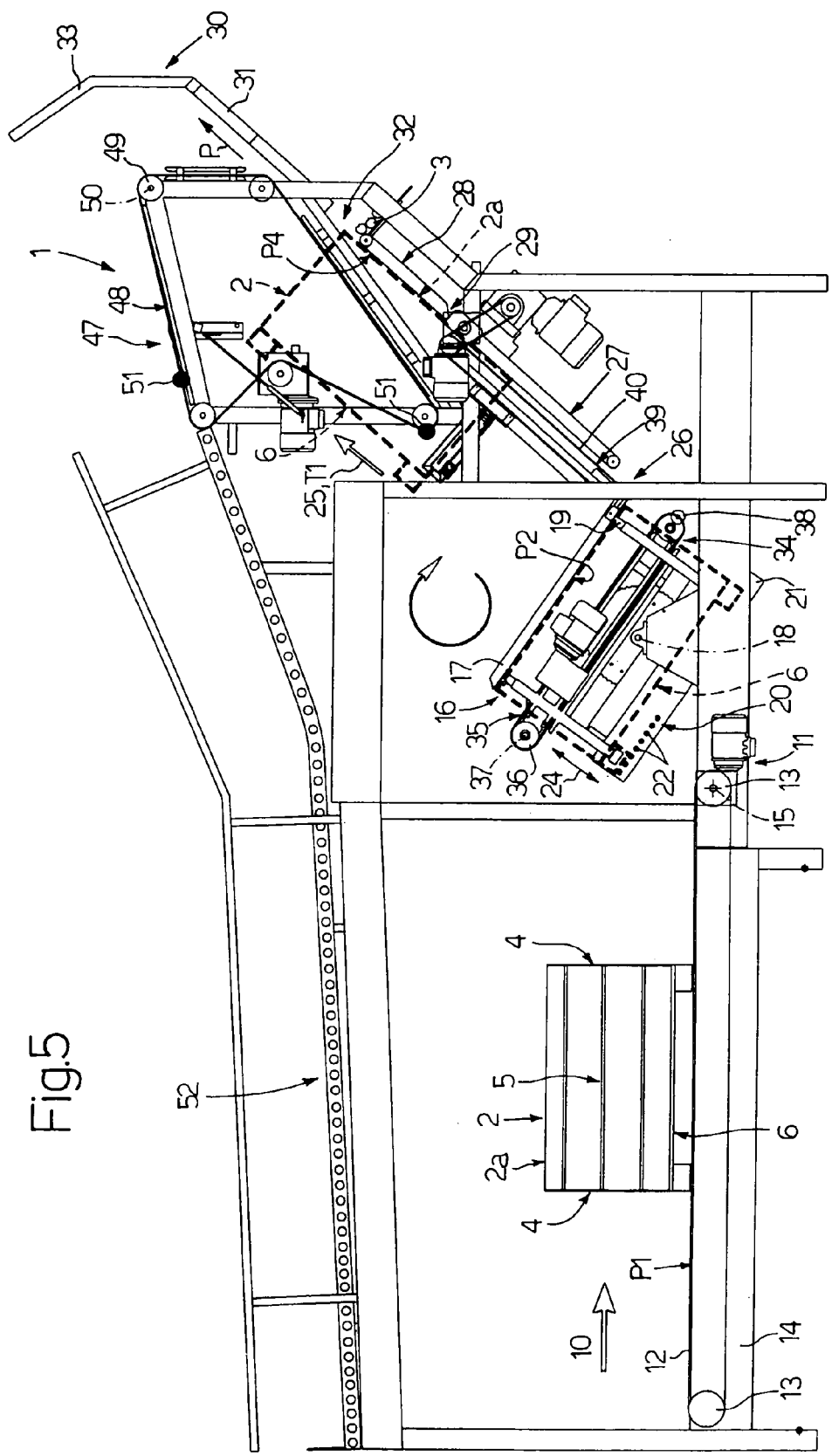
Figure 6:
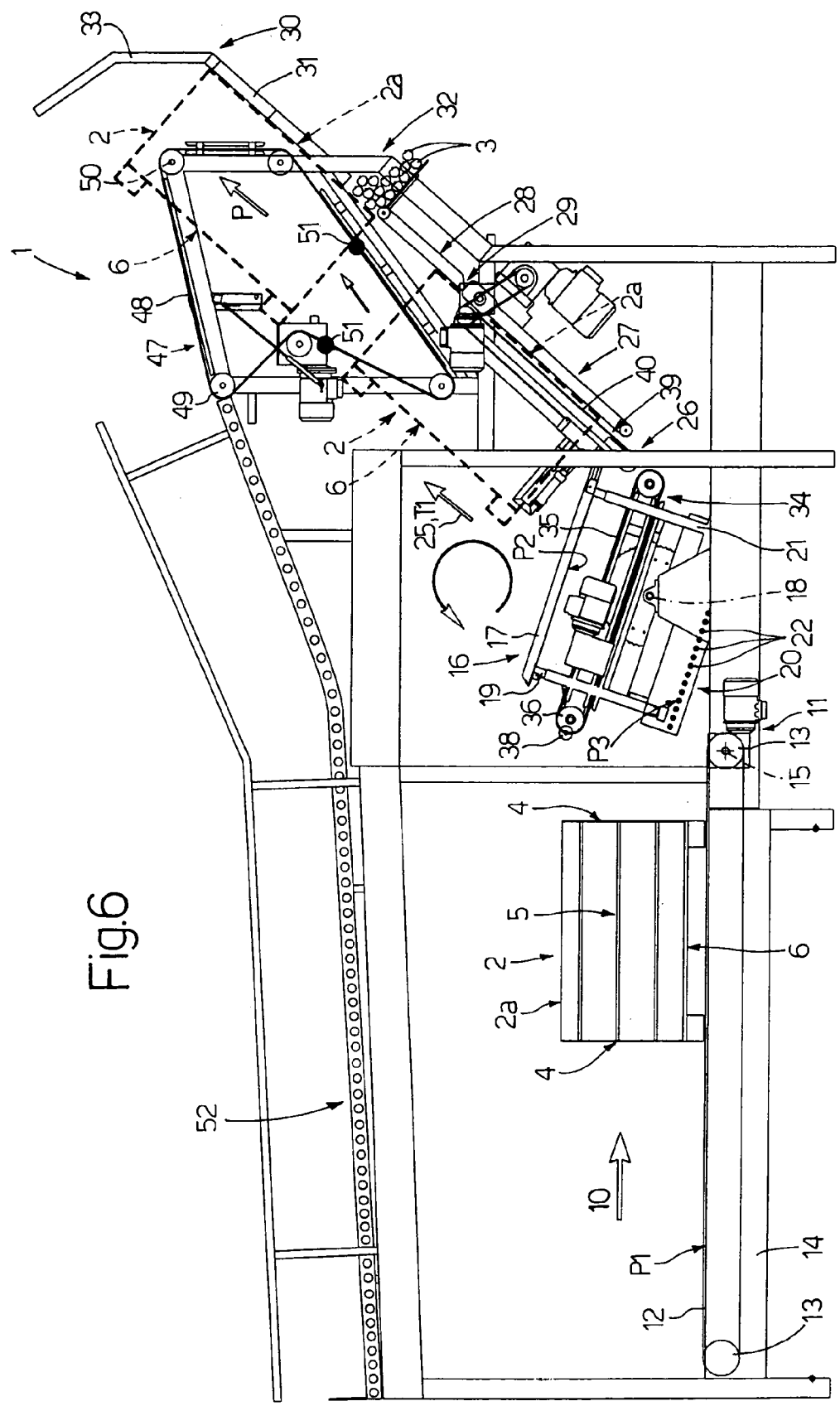
Figure 7:
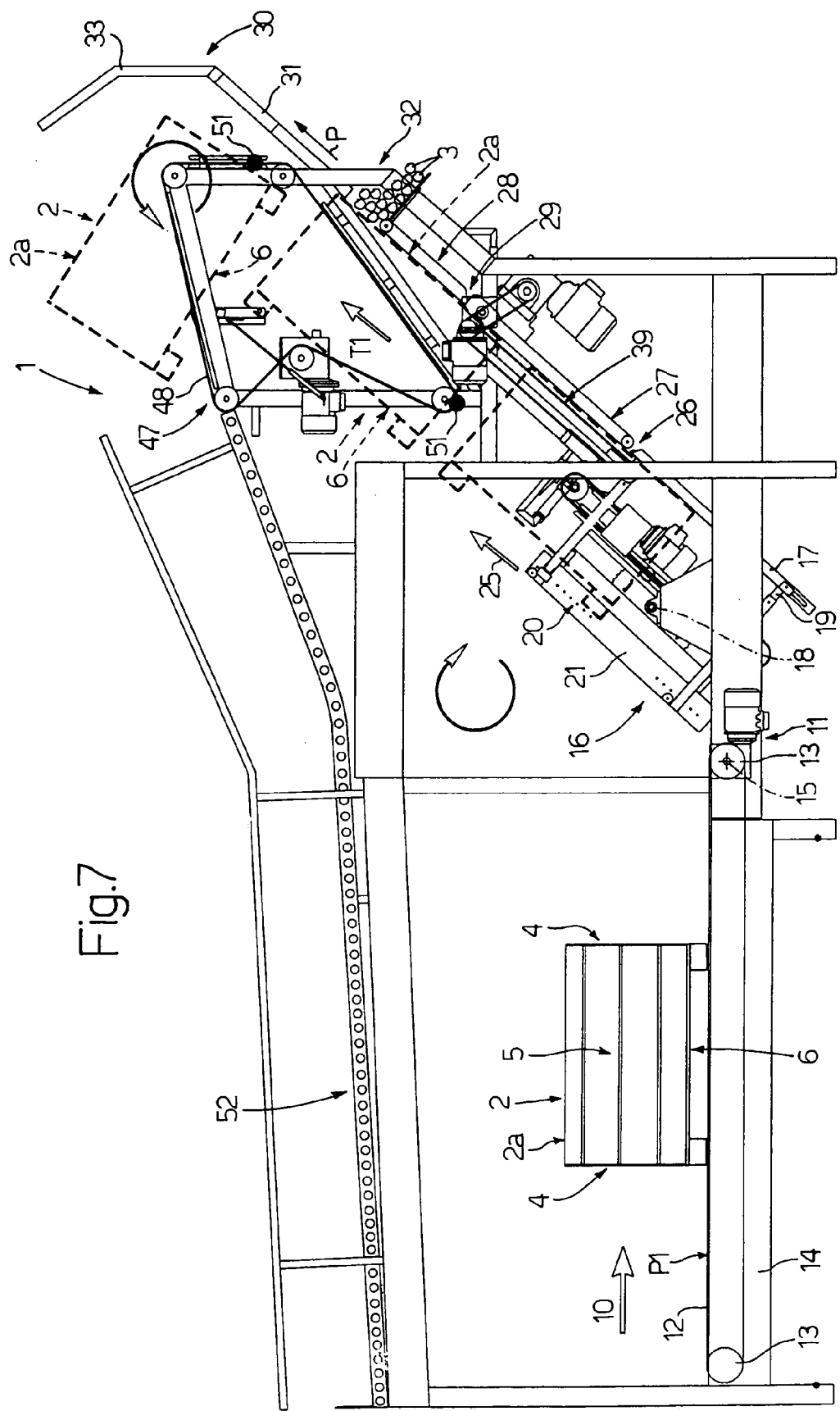

Number 1 in FIG. 1 indicates as a whole an apparatus for emptying containers 2 of loose fruit and vegetable produce 3 (FIGS. 5 to 7). Each container 2 is substantially cup-shaped, comprises two parallel lateral walls 4, two parallel lateral walls 5 perpendicular to walls 4, and a bottom wall 6 perpendicular to walls 4 and 5, and is open outwards at a surface 2a parallel to and opposite wall 6.

Apparatus 1 comprises two conveying devices 7 and 8; and a tipping device 9, which is located between devices 7 and 8, receives containers 2 successively from device 7, tips them, and unloads them successively onto device 8.

Conveying device 7 feeds containers 2, each with its concavity facing upwards, successively in a substantially horizontal traveling direction 10, is connected to device 9 at a transfer station 11, and comprises a conveyor belt 12 looped about two pulleys 13 (one of which is powered) fitted to a fixed frame 14 of apparatus 1 to rotate, with respect to frame 14, about respective axes 15 of rotation parallel to each other and crosswise to direction 10. Belt 12 has a top conveying branch defining a substantially horizontal conveying surface P1.

At station 11, containers 2 are fed successively from belt 12 to device 9, which has a rocking cradle 16. Cradle 16 comprises a flat plate 17 defining a supporting surface P2, is fitted in rotary manner to frame 14 to rock, with respect to frame 14 and by virtue of a known actuating device, about a hinge axis 18 substantially parallel to axes 15, and has a number of guides 19 projecting from plate 17 and perpendicular to surface P2.

Cradle 16 also comprises a roller conveyor 20, in turn comprising a supporting frame 21, and a number of rollers 22, which define a supporting surface P3 substantially parallel to and facing surface P2, and are fitted to frame 21 to rotate, with respect to frame 21, about respective axes 23 of rotation parallel to one another and to axes 15 and 18. Frame 21 is fitted in sliding manner to guides 19 to move linearly, with respect to plate 17 and by virtue of a known actuating device (not shown), in a direction 24 perpendicular to surfaces P2 and P3, so as to move conveyor 20 and plate 17 with respect to each other between a release position, in which the distance, measured parallel to direction 24, between surfaces P2 and P3 is greater than the height of a container 2 measured perpendicular to relative bottom wall 6, and a gripping position, in which the distance between surfaces P2 and P3 substantially equals said height of container 2, so that plate 17 substantially contacts surface 2a.

Cradle 16 is movable between a first operating position (FIGS. 1 and 2), in which surface P3 is coplanar with surface P1, and a second operating position (FIGS. 3 and 7), in which surfaces P2 and P3 are parallel to a direction 25 forming, in the example shown, an angle A of other than 0° and 90° with direction 10.

Figure 2:
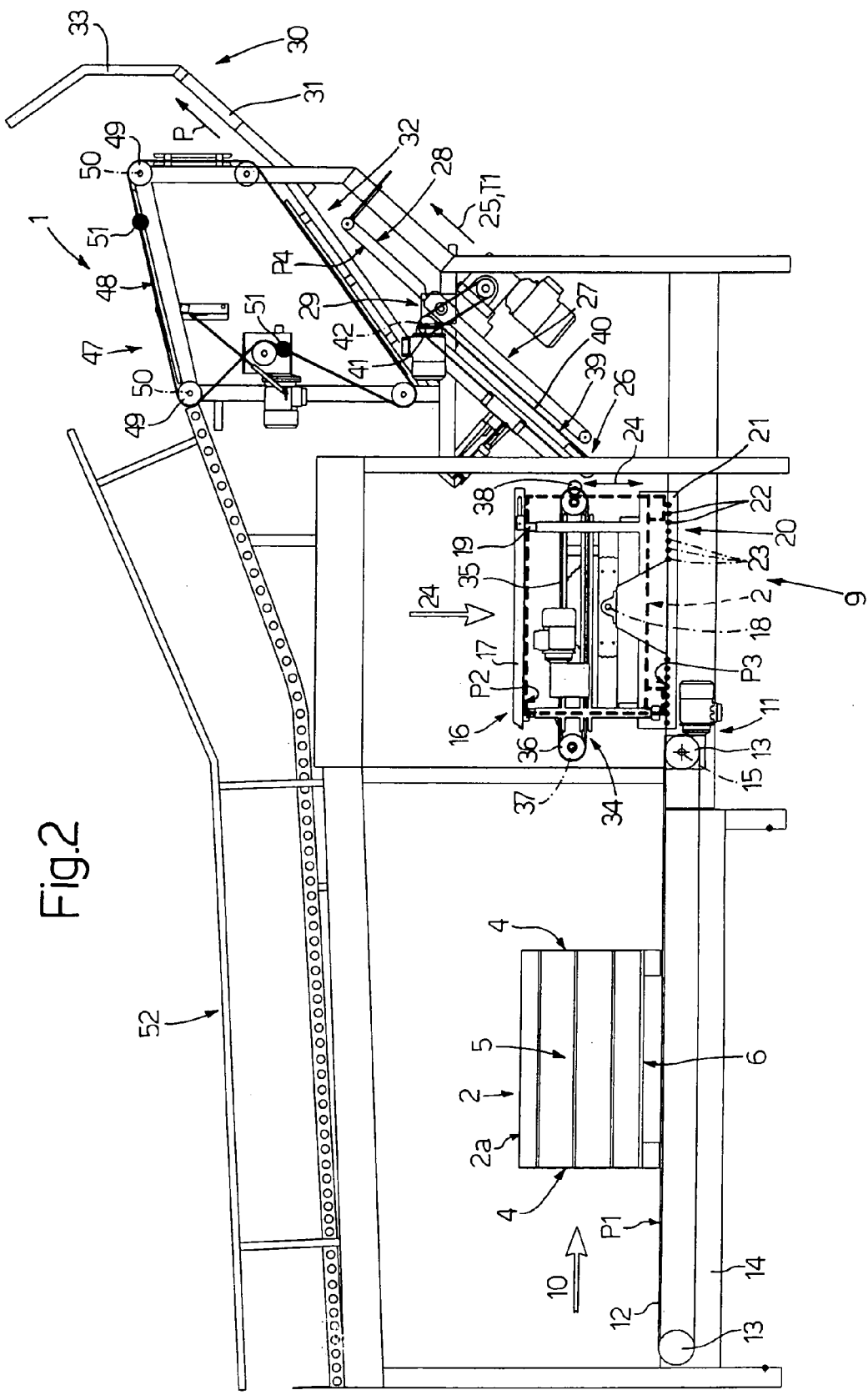
Figure 3:
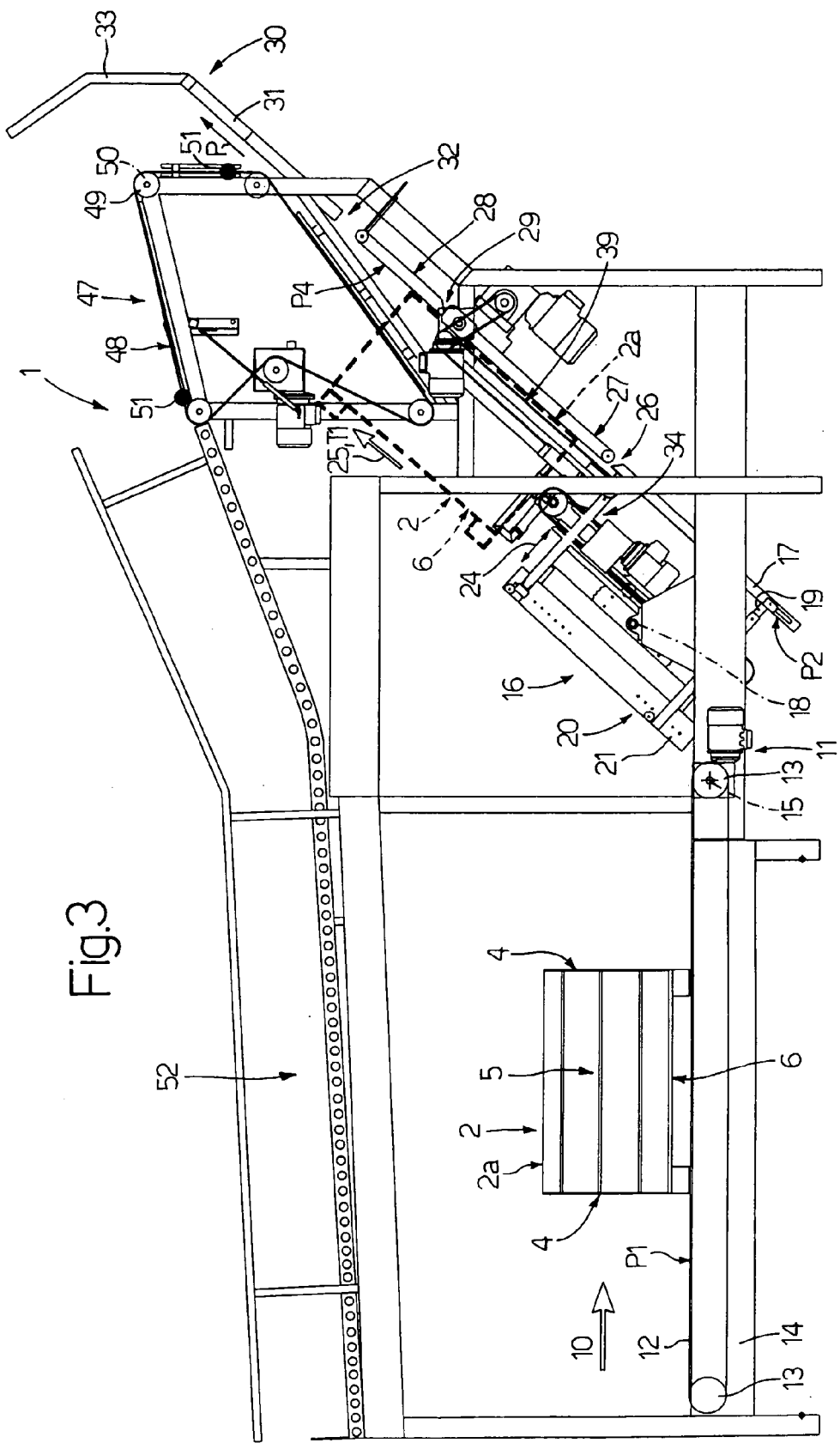
Figure 4:
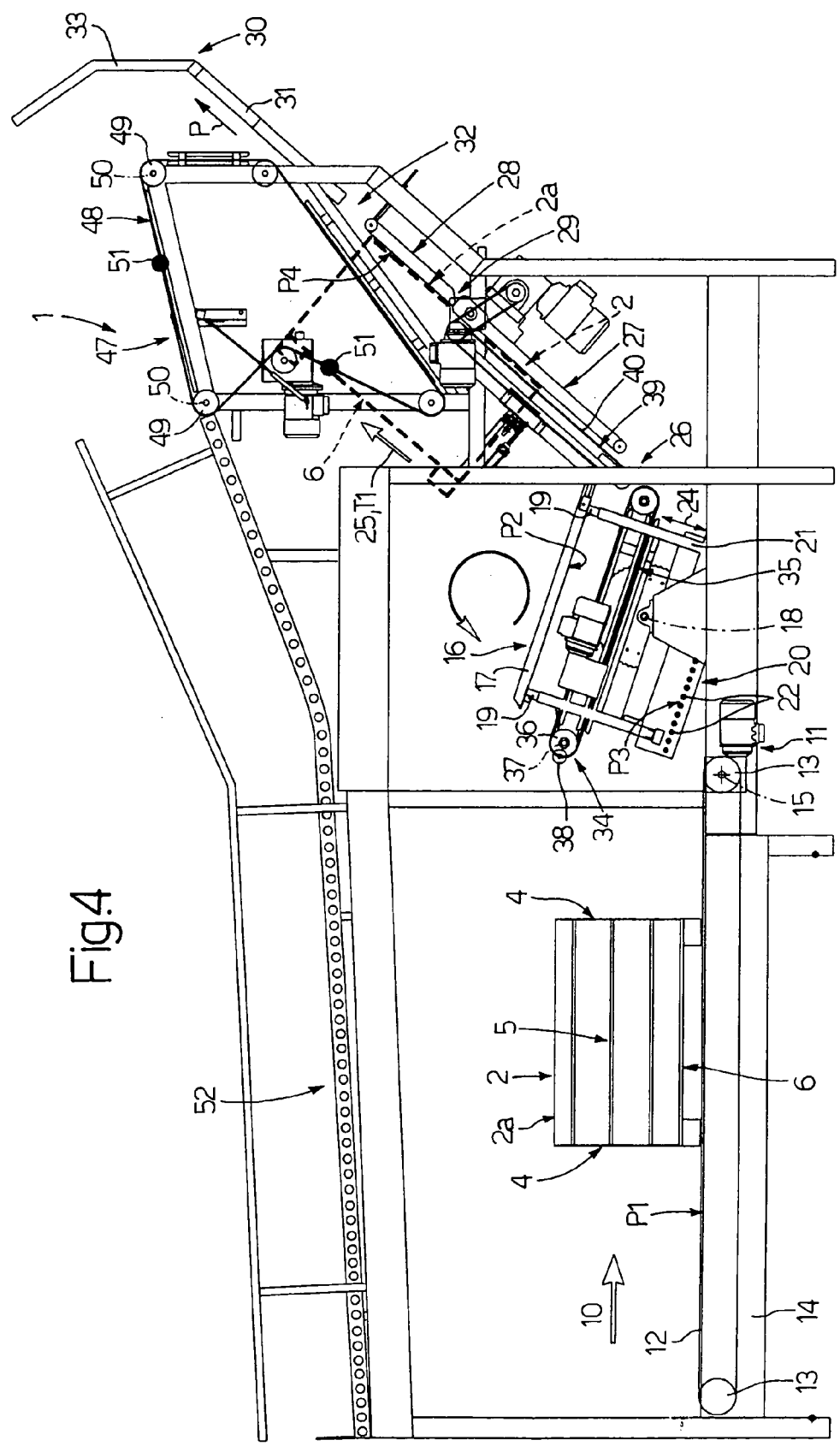

In actual use, and as of when cradle 16 is set to the release position and first operating position, conveyor belt 12 feeds a container 2 through station 11 onto rollers 22 of conveyor 20, and up to a stop member (not shown) fitted to cradle 16 and parallel to axes 23 (FIGS. 1 and 2). At this point, cradle 16 moves into the gripping position, so that plate 17 prevents spillage of produce 3 from container 2, then moves into the second operating position (FIG. 3) to tip container 2 with its concavity facing downwards, and finally moves back into the release position to unload container 2 onto conveying device 8.

Device 8 extends from an input station 26 and along a given path P, and comprises two powered endless conveyors 27 and 28, which are located in series to define a first portion T1 of path P substantially parallel to direction 25, are connected to each other at a transfer station 29, and have respective coplanar conveying branches defining a supporting surface P4 parallel to direction 25 and coplanar with surface P2 when cradle 16 is in the second operating position.

Conveyors 27 and 28 are so designed that the length L1, measured parallel to direction 25, of portion T1 is greater than the length L2 of a container 2, also measured parallel to direction 25, and that the length of conveyor 27, measured parallel to direction 25, substantially equals length L2 of a container 2.

Device 8 also comprises a known contoured guide 30, which is arc-shaped and, in turn, comprises an input portion 31, coplanar with surface P4 and located a given distance from conveyor 28 to define, at the top end of portion T1, an emptying station 32 for emptying containers 2; and an output portion 33 with its concavity facing downwards.

To unload containers 2 onto conveyor 27, device 9 comprises an ejecting device 34, in turn comprising two chain conveyors 35 (only one shown in FIGS. 1 to 7), which are located on opposite sides of roller conveyor 20, are looped about respective pairs of pulleys 36 fitted to cradle 16 to rotate, with respect to cradle 16, about respective axes 37 of rotation parallel to axes 23, and are connected to each other by a push roller 38 substantially parallel to axes 37 and for engaging the rear of each container 2 in direction 25.

Once container 2 has been unloaded onto conveyor 27, cradle 16 moves back into the first operating position (FIG. 4) to receive the next container 2 in the same way as described above, and the unloaded container 2 is fed along conveyor 27 by a feed device 39 comprising two chain conveyors 40 (only one shown in FIGS. 1 to 7), which are located on opposite sides of portion T1, are looped about respective pairs of pulleys 41 fitted to frame 14 to rotate, with respect to frame 14, about respective axes 42 of rotation parallel to axes 37.

Figure 8:
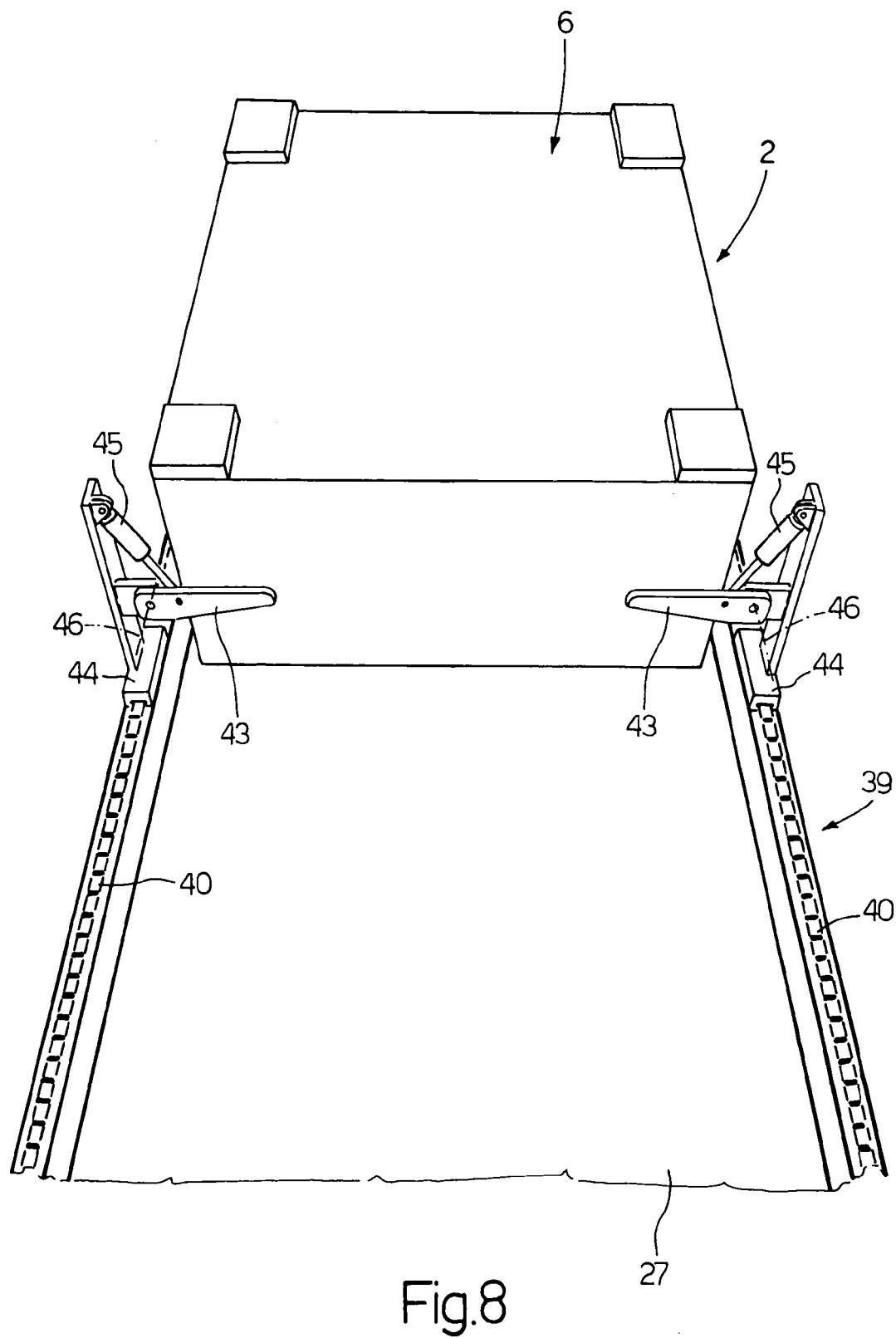
FIG. 8 shows a schematic view in perspective, with parts removed for clarity, of a detail in FIGS. 1 to 7.

With reference to FIG. 8, each conveyor 40 has a push member 43, which is aligned with the push member 43 of the other conveyor 40 in a direction perpendicular to the FIG. 1-7 plane, is hinged to a support 44 fixed to conveyor 40, and is swung by an actuating cylinder 45, with respect to support 44 and about a hinge axis 46 parallel to direction 25, between a lowered position, in which members 43 engage path P to engage the rear of containers 2 in direction 25, and a raised position (not shown), in which members 43 clear path P.

In connection with the above, it should be pointed out that conveyors 40 are so powered as to impart to members 43 a straight, back and forth movement in direction 25, comprising a forward stroke to feed container 2 to conveyor 28, and a return stroke, in which members 43 are raised to avoid interfering with the next container 2.

To feed containers 2 along conveyor 28, through emptying station 32, and along guide 30, device 8 comprises a feed device 47, in turn comprising two chain conveyors 48 (only one shown in FIGS. 1 to 7), which are located on opposite sides of path P, are looped about respective numbers of pulleys 49 fitted to frame 14 to rotate, with respect to frame 14, about respective axes 50 of rotation parallel to axes 42, and are connected to each other by two push rollers 51, each of which is substantially parallel to axes 50, and is fed forward in time with a relative container 2 to engage the rear of relative container 2 in direction 25.

As shown in FIG. 7, once containers 2 are emptied, and downstream from emptying station 32, feed device 47 cooperates with output portion 33 of guide 30 to turn containers 2 over, again with their respective concavities facing upwards, onto a known output chute 52.

Operation of apparatus 1 can easily be deduced from the foregoing description, with no further explanation required.

It should be pointed out, however, that each container 2 is unloaded by tipping device 9 onto conveyor 27 after the previous container 2 has been transferred completely from conveyor 27 to conveyor 28 (FIG. 5), and that, during part of the transfer of each container 2 from conveyor 27 to conveyor 28, conveyor 28 is still engaged by the previous container 2 (FIG. 6). Consequently, the traveling speeds of containers 2 along conveyors 27 and 28 are selectively controlled so that, as each container 2 is being unloaded by tipping device 9 onto conveyor 27, ejecting device 34 and conveyor 27 are so operated as to feed container 2 forward at a relatively high traveling speed V1, and, during at least part of the transfer of each container 2 from conveyor 27 to conveyor 28, conveyors 27 and 28 are so operated as to feed container 2 forward at a relatively low traveling speed V2, lower than speed V1 and substantially equal to the speed at which container 2 must be fed through emptying station 32 for container 2 to be emptied properly.

The invention claimed is:

1. An apparatus for emptying containers of fruit and vegetable produce, the apparatus comprising:
    a tipping device for tipping at least one container and movable between a first operating position to load said container, and a second operating position to unload the container; and
    a conveying device having an input station for receiving the container from the tipping device, and an emptying station for emptying the container, the conveying device feeding the container in a given first direction and along a path extending between said input and emptying stations; and
    wherein said path is of a length, measured parallel to said first direction, at least equal to a length of said container, also measured parallel to said first direction; and
    wherein the emptying of the container commences after the container has been entirely unloaded from the tipping device and moved along said path; and
    wherein the conveying device comprises first and second conveying means arranged in series along said path; and
    an ejecting device for transferring said container from the tipping device to said first conveying means at a first traveling speed; and
    actuating means for so controlling said second conveying means as to feed the container through said emptying station at a second traveling speed lower than said first traveling speed, and for so controlling said first conveying means as to selectively feed the container at said first traveling speed when transferring the container from the tipping device to the first conveying means, and at said second traveling speed during at least part of the transfer of the container from the first to the second conveying means.

2. The apparatus as claimed in claim 1, wherein said path is of a length, measured parallel to said first direction, greater than a length of said container, also measured parallel to said first direction.

3. The apparatus as claimed in claim 1, wherein the first conveying means feeds said container along a portion of the path having a length, measured parallel to said first direction, at least equal to a length of said container, also measured parallel to said first direction.

4. An apparatus as claimed in claim 1, and also comprising a further conveying device for feeding said container to said tipping device in a second direction sloping with respect to said first direction by an angle of other than 90°.

* * * * *